July 29, 1924.

S. A. AGGERS

HOOK

Filed May 31, 1923

1,502,706

Inventor
Samuel A. Aggers.

By A. J. O'Brien
Attorney

Patented July 29, 1924.

1,502,706

UNITED STATES PATENT OFFICE.

SAMUEL A. AGGERS, OF DENVER, COLORADO.

HOOK.

Application filed May 31, 1923. Serial No. 642,537.

*To all whom it may concern:*

Be it known that I, SAMUEL A. AGGERS, a citizen of the United States, residing at Denver, in the county of Denver and State of Colorado, have invented certain new and useful Improvements in Hooks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in hooks.

In the operation of drilling oil wells, loading and unloading cars of gravel, as well as in connection with hoists, derricks and similar apparatus, it is customary to subject a cable to a hard and an intermittent strain. It often happens that the hooks employed in connection with this type of apparatus break and that a great amount of damage and injury is caused thereby. In well drilling machines, where various kinds of tools are hoisted out of and removed from wells, it sometimes happens that an ordinary hook will become unhooked and permit rods and tools of various kinds to fall over and cause injury.

It is the object of this invention to produce a hook that shall be so constructed that it will have more strength per unit weight than the ordinary open hook. It is a further object of my invention to produce a hook that will not of its own accord become disconnected, even when slack is given which would be sufficient to cause an ordinary hook to become unhooked.

The above and other objects, which will become apparent as the description proceeds, are obtained by means of a construction which I will now describe in detail, reference for this purpose being had to the accompanying drawing, in which.

The same reference characters will be used to designate the same parts throughout the several views.

Figure 1:
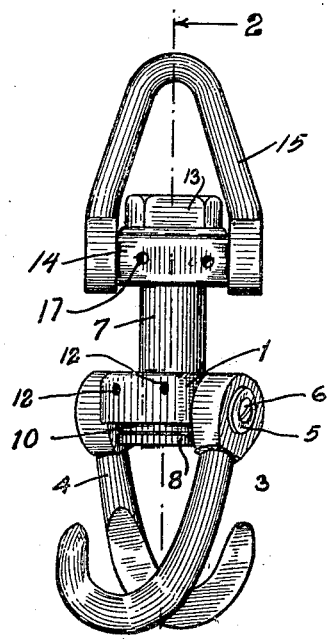
Fig. 1 is a side elevation of one embodiment of my invention, looking in the direction of the arrow 1, Fig. 2.
Figure 2:
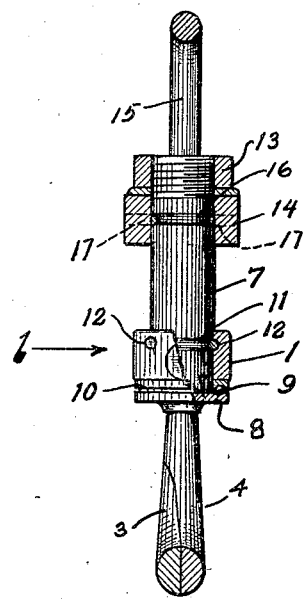
Fig. 2 is a section taken on line 2—2, Fig. 1.
Figure 3:
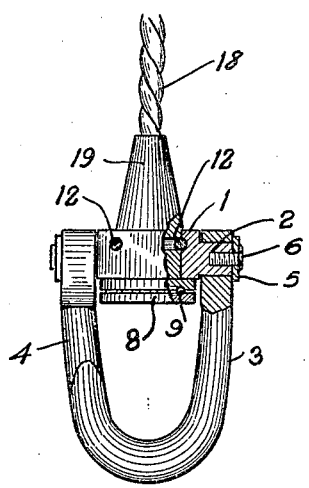
Fig. 3 shows my improved hook secured to the end of a wire rope.
Figure 4:
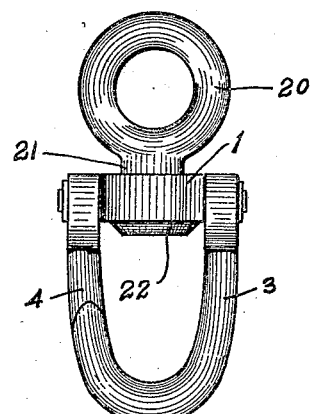
Fig. 4 shows my hook provided with an eyelet.

Numeral 1 designates what may be termed a yoke piece. This piece has a ring shape and has two diametrically opposed outwardly extending lugs 2 to which the hooks 3 and 4 are pivotally attached. The hooks are each held in place on the lugs 2 by means of a washer 5 which secures it to the end of the lug. The yoke 1 has a central opening for the reception of a stem 7 that is provided at one end with a head 8 whose inner surface is grooved to provide a raceway for the balls 9. A washer 10 is located between the head 8 and the yoke 1 and is grooved to form the other raceway for the balls, all as shown in Fig. 2. The stem 7 has an annular semi-circular groove 11 at a point between the sides of the yoke 1 and the latter is drilled for pins 12 which are so spaced that they engage the groove 11 and hold the stem 7 against longitudinal movement. The other end of the stem is threaded for the reception of a nut 13. A second yoke piece 14, similar to the yoke piece 1, is rotatably mounted on the end of the stem 7 and held in place thereon by means of the nut 13. A U-shaped member 15 is pivotally secured to the yoke member 14 in the same manner used in connection with the hooks 3 and 4. The stem has another annular groove 16 similar to the groove 11 and the yoke piece 14 is drilled for the reception of pins 17 which cooperate with the groove to prevent the yoke piece 14 from moving longitudinally thereon. The hooks 3 and 4 are identical in shape and size and can be opened or spread apart, in the manner shown in Fig. 1, for the purpose of enabling them to be secured to or "hooked" into a rope or ring. The hooks normally assume a closed position, such as shown in Figs. 2 and 3 which, obviously, does not permit them to become disconnected from whatever they are connected to. The embodiment of the invention, which is shown in Figs. 1 and 2 is designed for general application and fully illustrates my invention, but where the hook is to be permanently secured to the end of a wire cable 18, the stem 7 may be replaced by a tubular stem 19 to which the end of the cable 18 is secured in the usual manner. The stem 19 has a head 8 and is secured to the yoke piece 1 in exactly the same manner as described in connection with stem 7. Instead of forming the device in the manner shown in Figs. 1 and 2, I propose substituting for the stem 7 yoke piece 14 and U-shaped member 15, an eyelet 20 which has a stem 21 that extends through the yoke piece 1 and has its end riveted to form a head 22.

I want to call particular attention to the fact that my hook consists of two symmetrical complementary members that are each separately pivoted to a yoke piece and which normally form with the yoke piece a closed space, but which are relatively movable to permit a ring link or rope to be inserted into the same. It is evident that a hook of the type shown and described can be made amply strong for any purpose to which it is to be put and that it will not become disconnected. The two hooks being reversely arranged form what is substantially equivalent to a U-shaped loop and therefore they are not subjected to bending strains in the manner of an ordinary hook. The hook members 3 and 4 are so proportioned that the lower curved ends are larger in proportion than the sides or arms, so that there can be no danger of the hooks straightening or breaking.

Having now described my invention, what I claim as new is:

A hook comprising, in combination, a ring-shaped yoke piece having a circular central opening; a cylindrical stem in said opening and rotatably connected thereto; a pair of outwardly projecting lugs on opposite sides of said yoke; a hook pivotally connected to each stud, said hooks being substantially identical and reversely arranged whereby they will cooperate to form with the yoke piece an enclosed space adapted to receive the device to which it is connected.

In testimony whereof I affix my signature.

SAMUEL A. AGGERS.